(12) United States Patent
Shin et al.

(10) Patent No.: US 12,248,064 B2
(45) Date of Patent: Mar. 11, 2025

(54) AUGMENTED REALITY GLASSES TOPOLOGY USING ULTRASONIC HANDSHAKES ON FRAMES

(71) Applicant: GOOGLE LLC, Mountain View, CA (US)

(72) Inventors: Dongeek Shin, Santa Clara, CA (US); Adarsh Prakash Murthy Kowdle, San Francisco, CA (US); Jingying Hu, Menlo Park, CA (US); Andrea Colaco, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 228 days.

(21) Appl. No.: 17/651,152

(22) Filed: Feb. 15, 2022

(65) Prior Publication Data
US 2023/0258798 A1    Aug. 17, 2023

(51) Int. Cl.
*G01S 15/10*    (2006.01)
*G06F 3/03*    (2006.01)
*G02B 27/01*    (2006.01)

(52) U.S. Cl.
CPC .............. *G01S 15/104* (2013.01); *G06F 3/03* (2013.01); *G02B 27/017* (2013.01); *G02B 2027/0178* (2013.01)

(58) Field of Classification Search
CPC ....... G01S 15/104; G06F 3/03; G02B 27/017; G02B 2027/0178
See application file for complete search history.

(56) References Cited

U.S. PATENT DOCUMENTS

| | | | |
|---|---|---|---|
| 9,720,083 B2 | 8/2017 | Johnson et al. | |
| 10,535,364 B1 | 1/2020 | Zhong et al. | |
| 10,750,302 B1 | 8/2020 | Zhong et al. | |
| 11,089,416 B1* | 8/2021 | Zhong | H04R 29/004 |
| 2005/0073648 A1 | 4/2005 | Toshima et al. | |
| 2019/0261113 A1* | 8/2019 | Norris | H04S 1/007 |
| 2021/0176555 A1* | 6/2021 | Hoffmann | H03G 5/165 |
| 2022/0053281 A1* | 2/2022 | Sheaffer | H04R 1/1008 |
| 2022/0107616 A1* | 4/2022 | Yang | G06F 1/3265 |

FOREIGN PATENT DOCUMENTS

| | | |
|---|---|---|
| CN | 111175979 A | 5/2020 |
| WO | 2020253446 A1 | 12/2020 |

OTHER PUBLICATIONS

International Search Report and Written Opinion for PCT Application No. PCT/US2022/081639, mailed on Apr. 6, 2023, 15 pages.

* cited by examiner

*Primary Examiner* — Isam A Alsomiri
*Assistant Examiner* — Abdallah Abulaban
(74) *Attorney, Agent, or Firm* — Brake Hughes Bellermann LLP (57) ABSTRACT

Smart glasses including a first audio device, a second audio device, a frame including a first portion, a second portion, and a third portion, the second portion and the third portion are moveable in relation to the first portion, the second portion including the first audio device and the third portion including the second audio device, and a processor configured to cause the first audio device to generate a signal, receive the signal via the second audio device, estimate a distance based on the received signal, and determine a configuration of the frame.

20 Claims, 7 Drawing Sheets

AUGMENTED REALITY GLASSES TOPOLOGY USING ULTRASONIC HANDSHAKES ON FRAMES

FIELD

Embodiments relate to using augmented reality wearable devices.

BACKGROUND

Estimating a three dimensional (3D) glasses topology (e.g., how much are the temples bent) associated with smart glasses can assist (e.g., trigger) execution of proactive user interface (UI) applications. For example, a display could be turned on as the user unfolds the smart glasses. However, augmented reality (AR) glasses typically use an external mechanism (e.g., an external camera) to monitor the smart glasses in order to track smart glasses properties. Therefore, executing proactive UI applications may be limited to environments where the external mechanism is available and/or an additional device needs to be retained by the user increasing the cost to operate the proactive UI applications.

SUMMARY

In a general aspect, a device, a system, a non-transitory computer-readable medium (having stored thereon computer executable program code which can be executed on a computer system), and/or a method can perform a process with a method including generating a signal by a first audio device included in a first portion of a smart glasses, detecting the signal by a second audio device included in a second portion of the smart glasses, estimating a distance between the first portion and the second portion based on the detected signal, and determining a frame configuration of the smart glasses based on the estimated distance.

In another general aspect, a smart glasses including a first audio device, a second audio device, a frame including a first portion, a second portion, and a third portion, the second portion and the third portion are moveable in relation to the first portion, the second portion including the first audio device and the third portion including the second audio device, and a processor configured to cause the first audio device to generate a signal, receive the signal via the second audio device, estimate a distance based on the received signal, and determine a configuration of the frame.

Implementations can include one or more of the following features. For example, the first portion of the smart glasses can be an arm of a frame of the smart glasses that goes over an ear, and the second portion of the smart glasses can be the arm of the frame of the smart glasses proximate to a frame around a lens. Further configured to cause a triggering of an action using the smart glasses based on the frame configuration. The frame configuration can indicate a geometric position of portions of the frame of the smart glasses. The generating of the signal can include transmitting an audio signal not an electrical signal. The generating of the signal can include transmitting an ultrasonic pulse. The detecting of the signal can include filtering environmental interference. The detecting of the signal can include detecting a rising edge of a received pulse and generating a feature vector by cropping the received pulse based on the detected rising edge. Further configured to cause a generating of a score using a neural network with the feature vector as an input, wherein the determining of the configuration of a smart glasses is based on the score.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Estimating (e.g., determining) a smart glasses frame configuration (e.g., a folded configuration, an unfolded configuration, how much are the temples bent) from smart glasses itself can lead to many proactive user interface (UI) applications and/or application triggers. For example, the user unfolding glasses can trigger the turning on of the display, using glasses in speaker mode when one temple is folded, and/or the like. However, smart glasses typically don't have a mechanism to internally measure smart glasses frame configurations. The problem is that, conventionally, an external device (e.g., a camera) is used to detect and/or track frame geometric properties of the glasses.

A technical solution, as described herein, uses an internal speaker-microphone combination on smart glasses to measure the frame configuration of the smart glasses. Each speaker-microphone pair (e.g., the speaker and microphone are on different portions of the frame) can establish an inaudible, ultrasonic handshake that can be used to measure the component-to-component distance. Then, by collecting all possible speaker-microphone pair distance measurements, a neural network can be trained to map a list of distances into geometric details (e.g., temple-hinge angle values, frame coordinates, and/or the like) that can be used to determine (or estimate) the frame configuration of the smart glasses.

The benefit of this technical solution is using the existing (e.g., no additional hardware is required) smart glasses audio system as an ultrasonic network that can generate geometric details corresponding to the frame configuration of the smart glasses. Accordingly, an internal mechanism can be used as an input to UI applications and/or application triggers.

Figure 1:
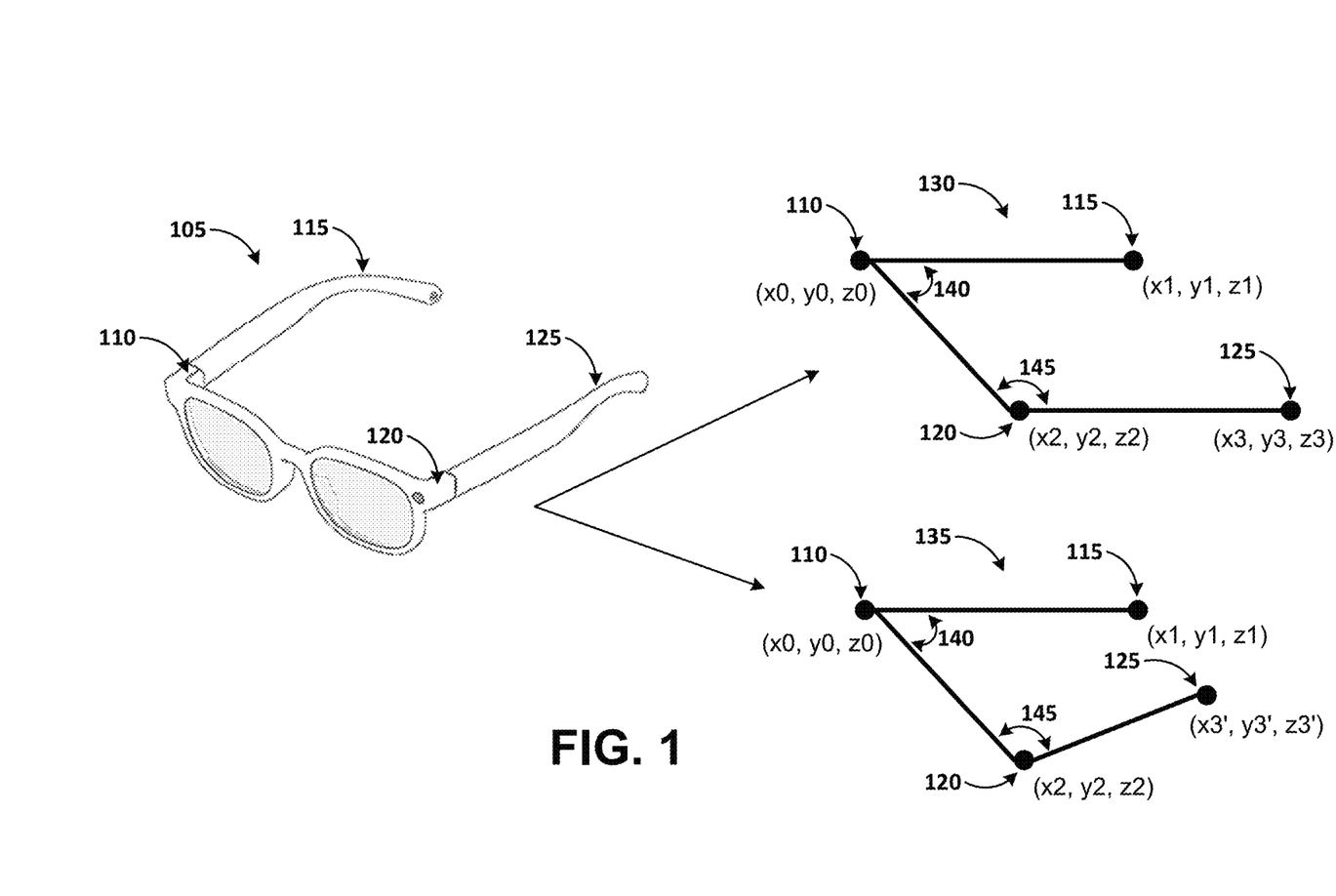
FIG. 1 illustrates a smart glasses frame configuration according to an example implementation.

FIG. 1 illustrates a smart glasses frame configuration according to an example implementation. As shown in FIG. 1, a smart glasses 105 has a corresponding three-dimensional (3D) topology 130, 135. Location 110, 115, 120, 125 have corresponding positions on the smart glasses 105 and the three-dimensional topology 130. Location 110 can have coordinates x0, y0, z0. Location 115 can have coordinates x1, y1, z1. Location 120 can have coordinates x2, y2, z2. Location 125 can have coordinates x3, y3, z3. Location 110, 120 can have a relatively fixed position and location 115, 125 can have a moveable position.

Figure 2A:
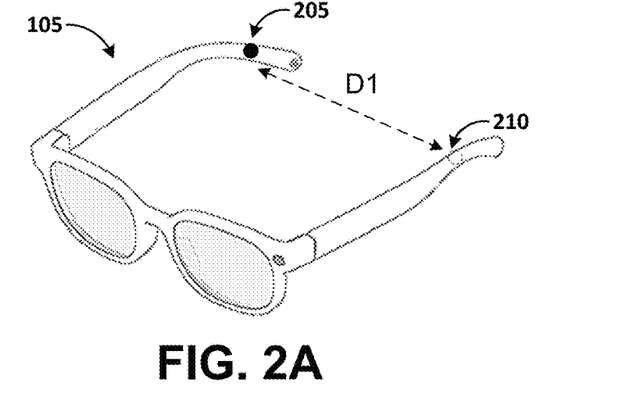
FIG. 2A illustrates a smart glasses hardware configuration according to an example implementation.
Figure 2B:
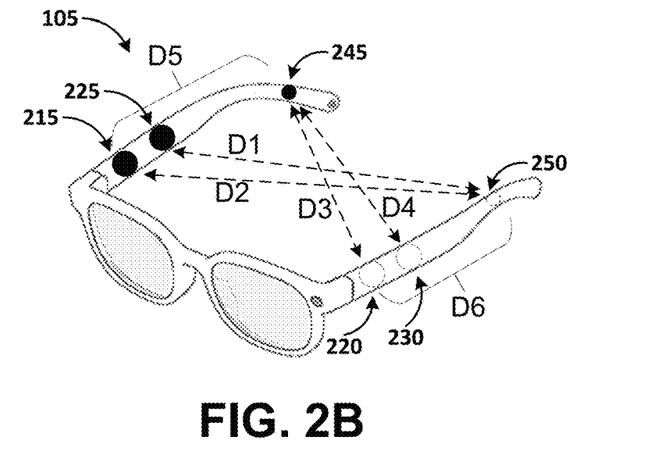
FIG. 2B illustrates a smart glasses hardware configuration according to an example implementation.
Figure 2C:
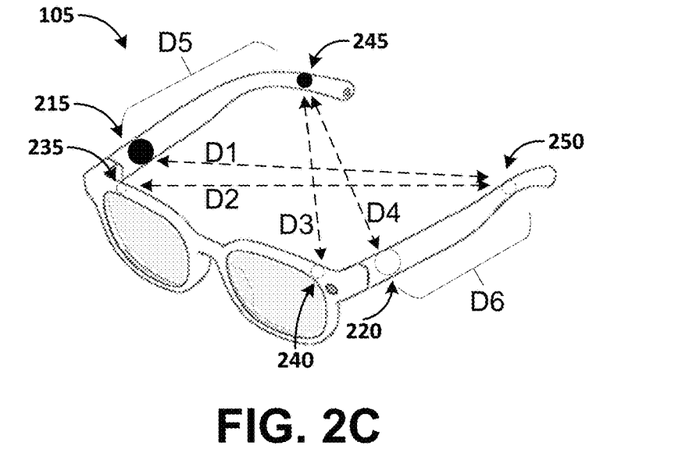
FIG. 2C illustrates a smart glasses hardware configuration according to an example implementation.

The frame configuration of the glasses 105 can be based on the position of location 115 and/or location 125 relative to location 110 and/or location 120. The frame configuration of the glasses 105 can be based on angle 140 and/or angle 145. Accordingly, the frame configuration of the glasses 105 can be based on a distance between location 110 and location 125 and/or a distance between location 120 and location 115 which can be used to estimate angle 140 and/or angle 145. For example, 3D topology 130 can represent the smart glasses 105 in an open frame configuration (e.g., an as worn frame configuration) with location 125 at coordinates x3, y3, z3. 3D topology 135 can represent the smart glasses 105 in a partially closed frame configuration with location 125 at coordinates x3', y3', z3'. 3D topology 135 can have a different (e.g., smaller) angle 145 as compared to angle 145 in 3D topology 130. Example implementations can use an audio system of the smart glasses 105 as an ultrasonic network that can generate geometric details (e.g., distances associated with (e.g., between) location 110, 115, 120, 125) corresponding to the frame configuration of the smart glasses. FIGS. 2A, 2B and 2C can illustrate examples of the audio system and geometric details of the smart glasses 105.

FIG. 2A illustrates a first smart glasses audio system hardware configuration according to an example implementation. FIG. 2B illustrates a second smart glasses audio system hardware configuration according to an example implementation. FIG. 2C illustrates a third smart glasses audio system hardware configuration according to an example implementation. Three audio system hardware configuration are illustrated for the sake of brevity. However, other audio system hardware configurations are within the scope of this disclosure.

As shown in FIG. 2A the smart glasses 105 can include speaker 205 and microphone 210. As shown in FIGS. 2B and 2C, the smart glasses 105 can include speakers 245, 250 and microphones 215, 220 on the arms of the frame of the smart glasses 105. FIG. 2A also includes microphones 225, 230 on the arms of the frame of the smart glasses 105. FIG. 2B includes microphones 235, 240 on the lens frame of the frame of the smart glasses 105. The smart glasses 105 can have a plurality of portions. For example, an arm of the frame can be a portion, the end of the arm that goes on the ear can be a portion, the frame around each lens can be a portion, and the like.

As shown in FIG. 2A, the speaker 205 can be located in a first portion or arm of the frame, or arm of the frame that goes over the ear. The microphone 210 can be located in a second portion or arm of the frame, or arm of the frame that goes over the ear. In example implementations, the speaker 205 and the microphone 210 should be located in different arms of the frame of the smart glasses 105.

Referring to FIGS. 2A and 2B, the speaker 245, 250 can be located in a first and a second portion or arm of the frame, or arm of the frame that goes over the ear. In an example implementation, the speaker 245, 250 can be located in the frame that goes over the ear in smart glasses 105. In example implementations, the speaker 245, 250 can be located in different arms of the frame of the smart glasses 105.

The microphones 210, 215, 220, 225, 230, 235, 240 can be located in various portions of the smart glasses 105, arm of the frame, arm of the frame that goes over the ear, and/or frame around each lens. Two or more of the microphones 210, 215, 220, 225, 230, 235, 240 can be located in the arm of the frame of the smart glasses 105 proximate to the frame around each lens. Two or more of the microphones 210, 215, 220, 225, 230, 235, 240 can be located in the arm of the frame relatively close to each other. Two or more of the microphones 210, 215, 220, 225, 230, 235, 240 can be located in the frame around each lens of the smart glasses 105. Two or more of the microphones 210, 215, 220, 225, 230, 235, 240 can be located in each arm of the frame of the smart glasses. In an example implementation, the microphones 215, 225 can be located in a first arm proximate to the frame around a first lens and the microphones 220, 230 can be located in a second arm of the frame proximate to the frame around a second lens of the smart glasses 105.

The speakers 205, 245, 250 can be an audio device (or a portion of an audio device) configured to generate and/or transmit a signal. The signal can be an ultrasonic signal. In other words, the signal can be inaudible. The signal can be a pulse. The signal can be an ultrasonic pulse. The signal can be generated as an electrical signal and the speakers 205, 245, 250 can transmit the signal as an audio or acoustic signal (not an electrical signal). In an example implementation, the ultrasonic pulse can be a linear chirp (e.g., a signal in which the frequency increases or decreases with time) that can sweep over a frequency_lower→frequency_upper range, that satisfies some conditions such as a frequency_lower can be set to be high enough to remove any audible components during transmission (e.g., approximately 21 kHz), frequency_upper can be lower than the Nyquist rate with some margin in order to avoid aliasing, and maximizing bandwidth (frequency_upper−frequency_lower) can help boost signal-to-noise ratio after pulse compression.

The microphones 210, 215, 220, 225, 230, 235, 240 can be an audio device configured to receive, detect and/or sense a signal. Accordingly, the microphones 210, 215, 220, 225, 230, 235, 240 can be an audio device configured to receive, detect and/or sense the signal generated by the speakers 205, 245, 250. The microphones 210, 215, 220, 225, 230, 235, 240 (and/or a processor or other device associated with the microphones 210, 215, 220, 225, 230, 235, 240) can be configured to filter environmental interference. Filtering environmental interference can include removing ambient signals that can interfere with the detected signal generated by the speakers 205, 245, 250. The speakers 205, 245, 250 and the microphones 210, 215, 220, 225, 230, 235, 240 can be on the inside of the frame of the smart glasses 105. Therefore, some of the components are illustrated using dashed lines.

A processor and/or other device associated with the microphones 210, 215, 220, 225, 230, 235, 240 can be configured to detect a rising edge of the detected signal generated by the speakers 205, 245, 250. A processor and/or other device associated with the microphones 210, 215, 220, 225, 230, 235, 240 can be configured to detect a rising edge of a received, detected and/or sensed pulse (e.g., as the detected signal generated by the speakers 205, 245, 250). A processor and/or other device associated with the microphones 210, 215, 220, 225, 230, 235, 240 can be configured to generate a feature vector by cropping (e.g., windowing portions of) the received pulse based on the detected rising edge.

Referring to FIG. 2A, the audio system hardware of the smart glasses 105 including the speaker 205 and microphone 210 can be configured to determine whether or not the smart glasses 105 are being worn by a user (e.g., on the head of a user). Further, the audio system hardware of the smart glasses 105 including the speaker 205 and microphone 210 can be configured to determine a transition between putting the smart glasses 105 on a user (e.g., on the head of a user) from being off the user and/or a transition between taking the smart glasses 105 off the user (e.g., off the head of the user) from being on the user. Placing the smart glasses 105 on the user can be referred to as a don operation and taking the smart glasses 105 off the user can be referred to as a doff operation.

In addition, the audio system hardware of the smart glasses 105 including the speaker 205 and microphone 210 can be configured to determine whether or not the smart glasses 105 are in a fully open frame configuration, a partially closed frame configuration, and/or a fully closed frame configuration. In an example implementation, the speaker 205 can generate and transmit a signal (as described above) and the microphone 210 can detect the signal. If the microphone 210 does not detect the signal, the smart glasses 105 can be estimated as being in a fully open frame configuration and being worn by the user (e.g., on the head of the user). In other words, the head of the user can prevent the microphone 210 from detecting the signal. Alternatively, the signal can have a delay that is sufficiently long (e.g., above a threshold delay) because the signal has travelled around the head of the user. Therefore, a signal delay above a threshold time can indicate that the smart glasses 105 are in a fully open frame configuration and being worn by the user (e.g., on the head of the user). In a smart glasses 105 wear transition case (e.g., off to on (don) or on to off (doff)), the transmitted signal can transition from detected to not detected by the microphone 210 (or a signal delay above a threshold time) or the transmitted signal can transition from not detected (or a signal delay above a threshold time) to detected by the microphone 210.

Determining whether or not the smart glasses 105 are in a fully open frame configuration, a partially closed frame configuration, and/or a fully closed frame configuration can include detecting the signal by the microphone 210 and determining, calculating, estimating, and the like a distance D1 (as shown in FIG. 2A) based on time of flight (e.g., a signal delay, a time delay, and the like) associated with the detected signal. In an example implementation, the fully open frame configuration and the fully closed frame configuration can have a corresponding distance D1. The partially closed frame configuration can be associated with any distance D1 that does not equal to the distance D1 corresponding to the fully open frame configuration distance D1 and the fully closed frame configuration distance D1.

The on/off transition detection of the smart glasses 105 can be used to trigger an action using the smart glasses 105. For example, the on/off transition detection of the smart glasses 105 can be used to trigger sleep on display, on-board cameras, mics, and the like. Triggering a sleep (or deactivation) operation when the smart glasses 105 transition to off (e.g., doff) can reduce power consumption. In addition, triggering the sleep (or deactivation) operation for a camera and/or a microphone (e.g., microphone 210) can make the smart glasses 105 privacy-aware smart glasses.

Referring to FIGS. 2B and 2C, the audio system hardware of the smart glasses 105 including the speakers 245, 250, the microphones 215, 220, 225, 230 and/or the microphones 215, 220, 235, 240 can be configured to determine a frame configuration of the smart glasses 105. As discussed above, the speakers 245, 250 can generate a signal and the microphones 215, 220, 225, 230, 235, 240 can detect the transmitted signal. The detected signal can be used to determine, calculate, estimate, and/or the like at least one of distance D1, D2, D3, D4, D5, and D6 (as shown in FIGS. 2B and 2C). One of the distances D1, D2, D3, D4, D5, and D6 or a combination of the distances D1, D2, D3, D4, D5, and D6 can be used to determine and/or estimate the frame configuration of the smart glasses 105.

The frame configuration of the smart glasses 105 can be used to trigger an action using the smart glasses 105. For example, depending on the frame configuration, the smart glasses 105 can record a conversation or capture a video (contingent on privacy acknowledgements). For example, the smart glasses 105 can be communicatively coupled (e.g., using a wireless communication standard) to a second device (e.g., a computing device) and, depending on the frame configuration, the smart glasses 105 can cause the second device to perform an operation. For example, the second device could be a video playback device and the smart glasses 105 can be configured to cause the video playback device to start, stop, pause, increase/decrease volume and the like a video being displayed by the playback device. Determining (or estimating) the frame configuration of the smart glasses 105 is described in more detail with regard to FIGS. 3A and 3B.

Figure 3A:
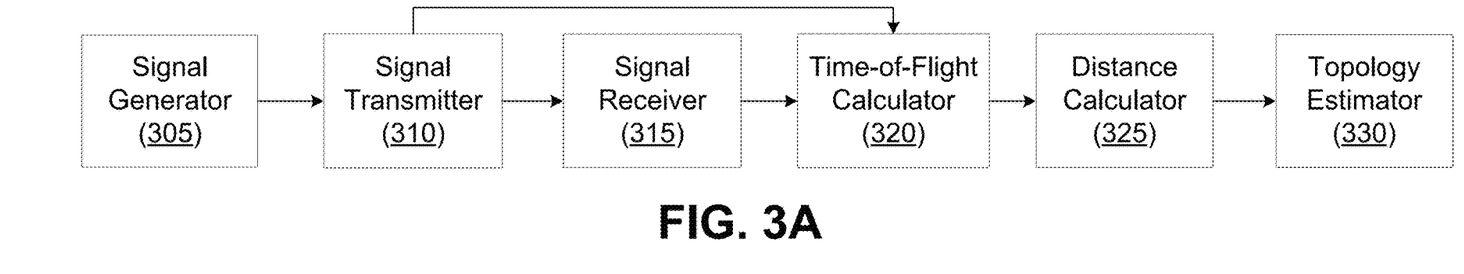
FIG. 3A illustrates a block diagram of a data flow according to an example implementation.

FIG. 3A illustrates a block diagram of a data flow according to an example implementation. As shown in FIG. 3A, the data flow includes a signal generator 305 block, a signal transmitter 310 block, a signal receiver 315 block, a time-of-flight calculator 320 block, a distance calculator 325 block, and a topology estimator 330 block. The signal transmitter 310 can be a speaker. For example, the signal transmitter 310 can be the speaker 205, 245, 250. The signal receiver 315 can be a microphone. For example, the signal receiver 315 can be the microphone 210, 215, 220, 225, 230, 235, 240.

The signal generator 305 can be configured to generate an acoustic signal. The signal can be an ultrasonic signal. In other words, the signal can be inaudible. The signal can be a pulse. The signal can be an ultrasonic pulse. The signal (or data representing the signal) can be communicated to the signal transmitter 310 (e.g., a speaker) and transmitted. The transmitted signal can be detected or received by the signal receiver 315 (e.g., a microphone) and the received signal (or data representing the signal) can be communicated to the time-of-flight calculator 320.

The time-of-flight calculator 320 can be configured to determine an amount of time between when the signal was transmitted by the signal transmitter 310 and when the signal was received by the signal receiver 315. For example, the signal transmitter 310 can communicate a time (e.g., clock cycle data) to the time-of-flight calculator 320. Further, the signal received from the signal receiver 315 can include a time stamp (e.g., clock cycle data). The time-of-flight calculator 320 can calculate a time delta as a time-of-flight (e.g., signal transmission time, signal delay, and the like) based on the time received from the signal transmitter 310 and the time associated with the signal received from the signal receiver 315.

Figure 4:
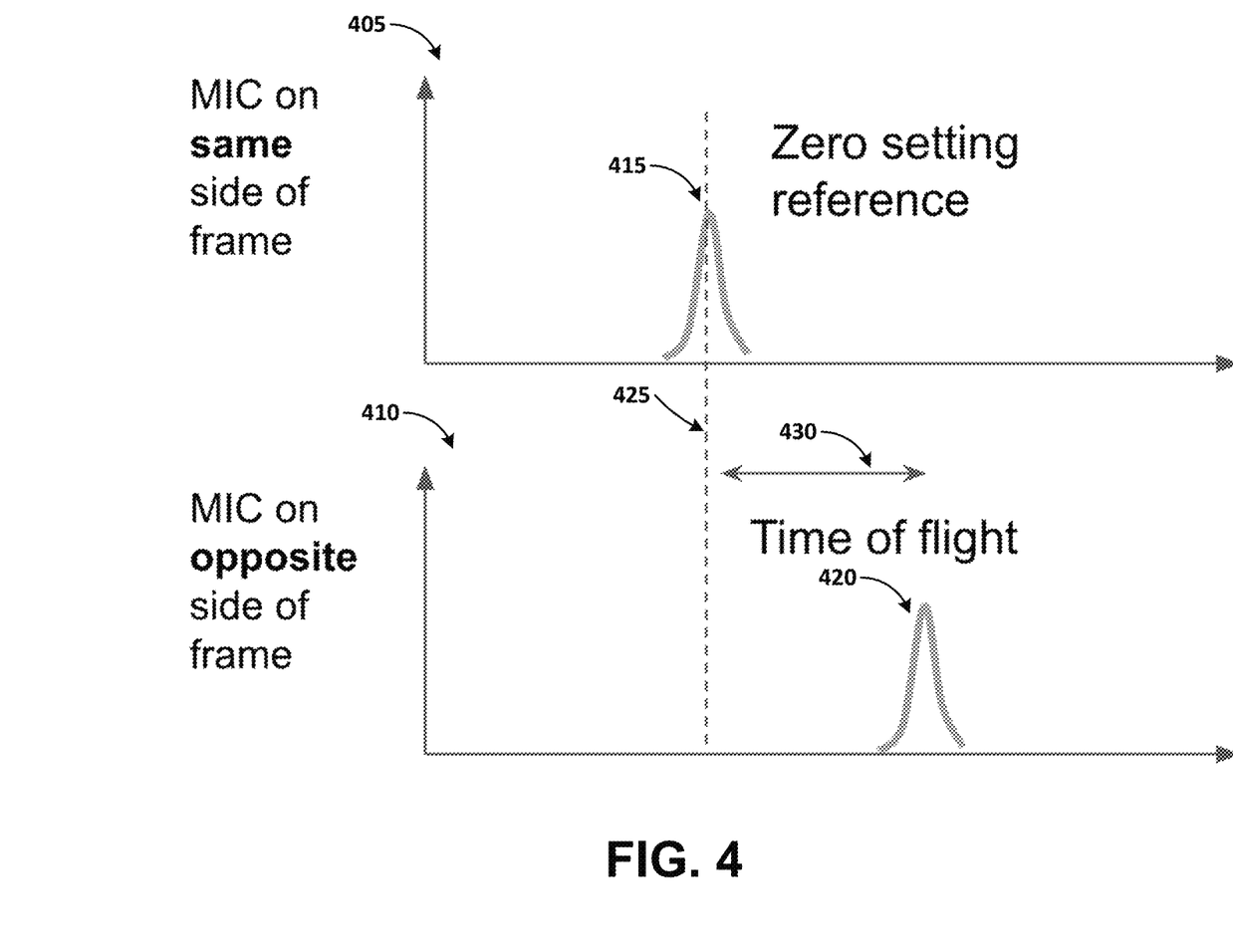
FIG. 4 illustrates signals associated with calculating time-of-flight according to an example implementation.

In another implementation, time-of-flight can be determined based on two received signals. A first signal can be used as a reference signal and a second signal can be used to determine time-of-flight with respect to the reference signal. FIG. 4 illustrates signals associated with calculating time-of-flight according to an example implementation. As shown in FIG. 4, a first graph 405 includes a reference signal 415. The reference signal 415 can be a signal that is transmitted by a speaker and received by a microphone that is on the same side of the smart glasses as the speaker. For example, referring to FIGS. 2B and 2C, the speaker can be speaker 245 and the microphone can be microphone 215 (or microphone 225, 235). Accordingly, reference signal 415 can be a signal (e.g., a pulse) transmitted by the speaker 245 and received by the microphone 215. Dashed line 425 represents the reference time or time zero for calculating the time-of-flight.

A second graph 410 includes a signal 420. The signal 420 can be a signal that is transmitted by a speaker and received by a microphone that is on the opposite side of the smart glasses as the speaker. For example, referring to FIGS. 2B and 2C, the speaker can be speaker 245 and the microphone can be microphone 220 (or microphone 230, 240). Accordingly, signal 420 can be a signal (e.g., a pulse) transmitted by the speaker 245 and received by the microphone 220. Line 430 represents the time-of-flight as the difference in time between a peak amplitude time of signal 420 and the reference time or time zero.

Returning to FIG. 3A, the distance calculator 325 can be configured to convert the time-of-flight associated with the received signal to a distance. The distance can be calculated as Distance=$c\tau/2$ where $\tau$ is the time-of-flight. In an example implementation, the calculated distance can be associated with a speaker (e.g., speaker 205, 245, 250) microphone (e.g., microphone 210, 215, 220, 225, 230, 235, 240) pair. For example, referring to FIGS. 2A, 2B, and 2C, the distance can be associated with one of the distances D1, D2, D3, D4, D5, and D6 illustrated in FIGS. 2A, 2B, and 2C.

The topology estimator 330 can be configured to use the calculated distance and determine (or estimate) a frame configuration. For example, the topology estimator 330 can determine (or estimate) the frame configuration associated with smart glasses 105. The topology estimator 330 can use one distance to determine (or estimate) the frame configuration associated with smart glasses 105. For example, the topology estimator 330 can use D1 as illustrated in FIG. 2A to determine (or estimate) the frame configuration associated with smart glasses 105. The topology estimator 330 can use two or more distances to determine (or estimate) the frame configuration associated with smart glasses 105. For example, the topology estimator 330 can use D1, D2, D3, D4, D5, and D6 illustrated in FIGS. 2B and 2C to determine (or estimate) the frame configuration associated with smart glasses 105.

The topology estimator 330 can use the distances to calculate a different value. For example, the topology estimator 330 can use D1, D2, D3, D4, D5, and D6 illustrated in FIGS. 2B and 2C to calculate angle 140 and/or angle 145. The topology estimator 330 can use angle 140 and/or angle 145 to determine (or estimate) the frame configuration associated with smart glasses 105. The topology estimator 330 can use a trained neural network that can be configured to predict the frame configuration associated with smart glasses 105 based on, for example, a combination of D1, D2, D3, D4, D5, and D6 illustrated in FIGS. 2B and 2C.

In the implementation illustrated in FIG. 2A, the topology estimator 330 can generate a default value indicating the smart glasses 105 are on a user (e.g., on the head of a user). For example, the topology estimator 330 can expect to receive a value for D1 and no value is received because no signal was received. Not receiving a value for D1 can trigger the output of a value indicating the smart glasses 105 are on the user instead of data representing the frame configuration associated with smart glasses 105.

Figure 3B:
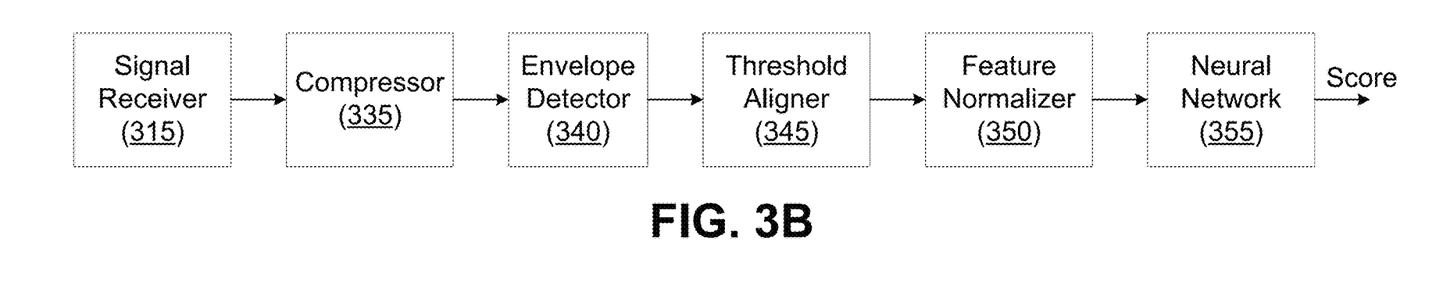
FIG. 3B illustrates a block diagram of a data flow according to an example implementation.

FIG. 3B illustrates a block diagram of a data flow according to an example implementation. As shown in FIG. 3B, the data flow includes the signal receiver 315 block, a compressor 335 block, an envelope detector 340 block, a threshold aligner 345 block, a feature normalizer 350 block, and a neural network 355 block. FIG. 3B is illustrated as beginning when the signal receiver 315 receives a signal. The signal can be generated by the signal generator 305 and transmitted by the transmitted by the signal transmitter 310.

The compressor 335 can be configured to compress the signal received by the signal receiver 315. As described above, the received signal can be a pulse (e.g., an ultrasonic pulse). Therefore, the compressor 335 can be configured to perform pulse compression. Pulse compression can use matched filtering to isolate a pulse-of-interest from environmental aggressors (e.g., speech) that are not relevant for determining a frame configuration and/or smart glasses use (e.g., worn or not worn by a user).

The envelope detector 340 can be configured to detect the amplitude variations of the compressed signal (e.g., compressed pulse) to generate a control signal based on the amplitude variations. In an example implementation, the matched filtered pulse goes through a half-wave envelope detector consisting of a pointwise absolute value operation and a low-pass filter (e.g., a short Gaussian filter).

The threshold aligner 345 can be configured to align the rising edge of the compressed pulse. For example, a fixed threshold crossing can be applied to the envelope to align where the rising edge of the received pulse.

The feature normalizer 350 can be configured to create a feature vector. For example, the resultant threshold aligned signal can be cropped with a known window to create the feature vector. In an example implementation, instead of relying on the rising edge to trigger the classifier, a small local max search heuristic from the rising edge can be used such that the search space is upper-bounded by the signal (e.g., chirp) length to align on the direct-path impulse response.

The neural network 355 can be configured to generate a score representing the frame configuration and/or a smart glasses use. The feature vector can be input to a one-dimensional (1D) temporal convolutional network (TCN) that outputs the score. The TCN may not fire on every received signal (or a set of received signals). For example, the neural network 355 can attempts classification on received signals that pass a threshold alignment heuristic. This hybrid design can save power because the TCN computationally expensive compared to a (less accurate) heuristic configured to generate the score. In addition, for classifier generalization where some temporal alignment for train/inference can reduce the load on the classifier to learn all temporal generalizations from potentially a much larger dataset.

Transmitting and receiving the signal continuously can drain the smart glasses battery relatively quickly. Therefore, example implementations can use an initial trigger (e.g., using an inertial measurement unit (IMU)) to indicate the smart glasses are not being charged or static, and are intended to be worn by the user causing the signal to be transmitted and received. For example, an IMU-based model can be configured to detect a lift event that precedes a smart glasses wear event. The system can be turned on after a device lift is confirmed by the IMU.

Figure 5:
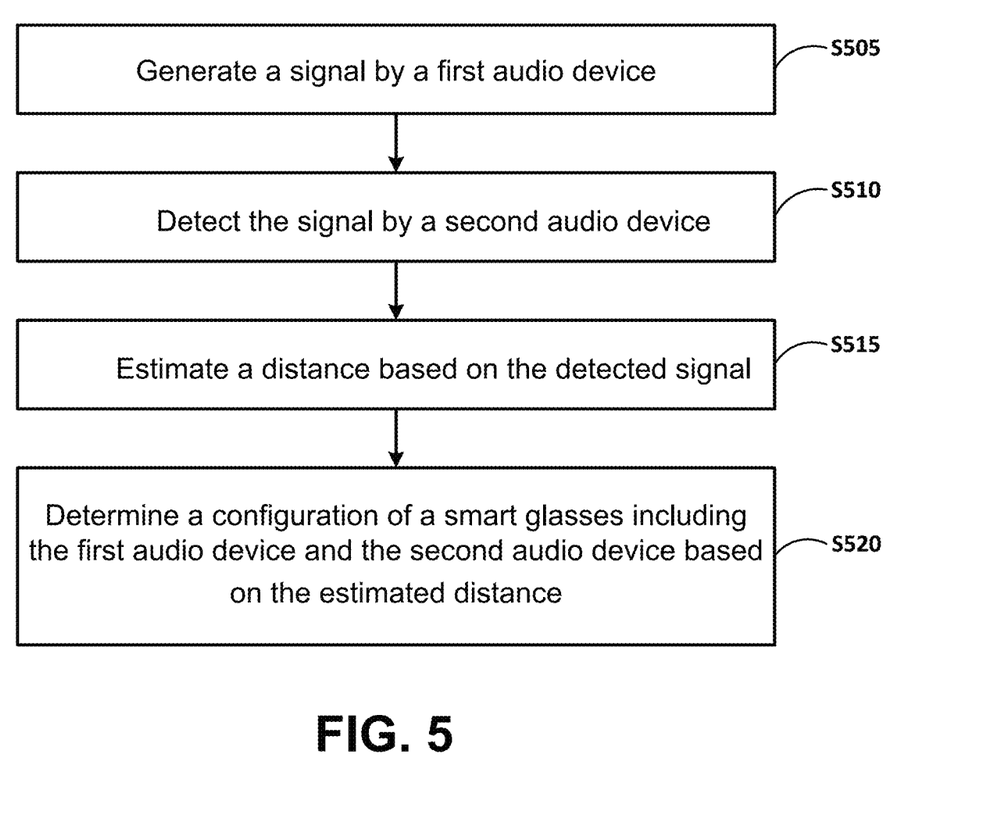
FIG. 5 illustrates a block diagram of a method for determining a smart glasses frame configuration according to an example implementation.

FIG. 5 illustrates a block diagram of a method for determining a smart glasses frame configuration according to an example implementation. As shown in FIG. 5, in step S505 a signal is generated by a first audio device included in a first portion of a smart glasses. For example, the first audio device can include a signal generator and a signal transmitter. The signal transmitter can be a speaker. The speaker can be included in the first portion of a smart glasses. For example, the speaker can be included in an arm of a frame of the smart glasses. Referring to FIGS. 2A, 2B, and 2C, the smart glasses can be smart glasses 105 and the speaker can be the speaker 205, 245, 250.

In step S510 the signal is detected by a second audio device included in a second portion of a smart glasses. For example, the second audio device can include a signal receiver. The signal receiver can be a microphone. The microphone can be included in the second portion of a smart glasses. For example, the microphone can be included in the same arm as the speaker and/or a different arm as the speaker in the frame of the smart glasses. Referring to FIGS. 2A, 2B, and 2C, the smart glasses can be smart glasses 105 and the microphone can be microphone 210, 215, 220, 225, 230, 235, 240.

In step S515 a distance between the first portion and the second portion is estimated based on the detected signal. For example, the detected signal can have a time-of-flight. The time-of-flight can be used to calculate the distance. Referring to FIGS. 2A, 2B, and 2C, the distance can be at least one of distance D1, D2, D3, D4, D5, and D6.

In step S520 a frame configuration of the smart glasses is determined based on the estimated distance. For example, the frame configuration and/or a smart glasses use can be determined based on at least one distance. Frame configuration and smart glasses use is described in more detail above. Referring to FIGS. 2A, 2B, and 2C, frame configuration and/or a smart glasses use associated with smart glasses 105 can be based on one of distance D1, D2, D3, D4, D5, D6 and/or a combination of distances D1, D2, D3, D4, D5, and D6.

Figure 6:
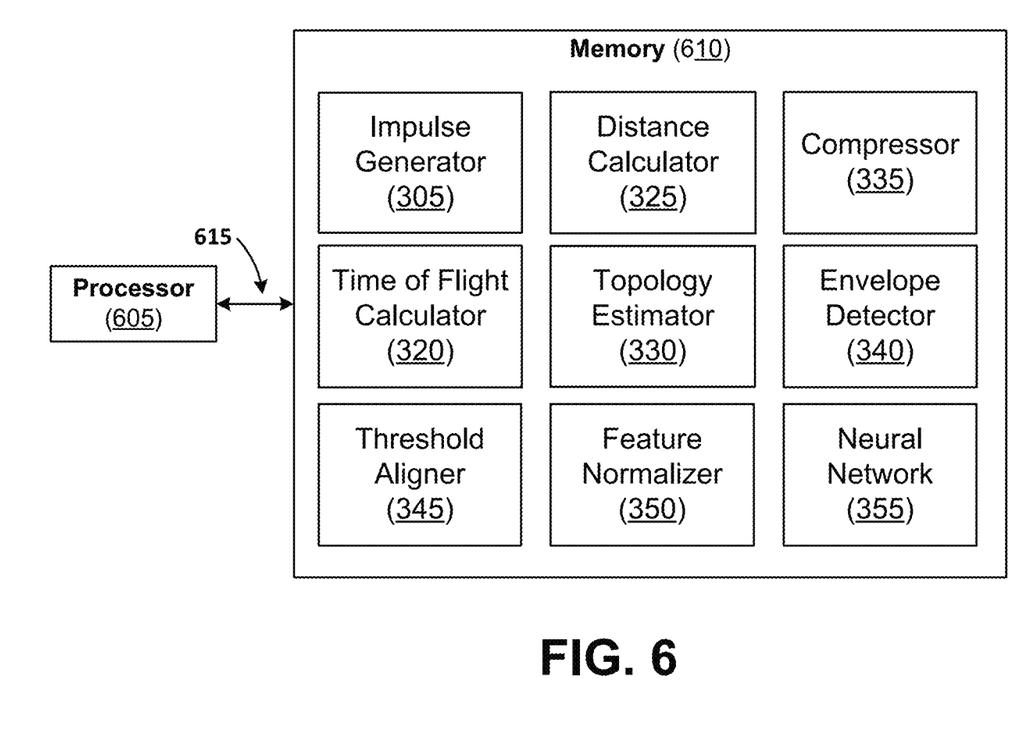
FIG. 6 illustrates a block diagram of a system for determining a smart glasses frame configuration according to an example implementation.

FIG. 6 illustrates a block diagram of a system for determining a smart glasses frame configuration according to an example implementation. In the example of FIG. 6, a system (e.g., a smart glasses) can include, or be associated with, a computing system or at least one computing device and should be understood to represent virtually any computing device configured to perform the techniques described herein. As such, the system may be understood to include various components which may be utilized to implement the techniques described herein, or different or future versions thereof. By way of example, the system can include a processor 605 and a memory 610 (e.g., a non-transitory computer readable memory). The processor 605 and the memory 610 can be coupled (e.g., communicatively coupled) by a bus 615.

The processor 605 may be utilized to execute instructions stored on the at least one memory 610. Therefore, the processor 605 can implement the various features and functions described herein, or additional or alternative features and functions. The processor 605 and the at least one memory 610 may be utilized for various other purposes. For example, the at least one memory 610 may represent an example of various types of memory and related hardware and software which may be used to implement any one of the modules described herein.

The at least one memory 610 may be configured to store data and/or information associated with the device. The at least one memory 610 may be a shared resource. Therefore, the at least one memory 610 may be configured to store data and/or information associated with other elements (e.g., image/video processing or wired/wireless communication) within the larger system. Together, the processor 605 and the at least one memory 610 may be utilized to implement the techniques described herein. As such, the techniques described herein can be implemented as code segments (e.g., software) stored on the memory 610 and executed by the processor 605. Accordingly, the memory 610 can include the signal generator 305 block, the time-of-flight calculator 320 block, the distance calculator 325 block, the topology estimator 330 block, the compressor 335 block, the envelope detector 340 block, the threshold aligner 345 block, the feature normalizer 350 block, and the neural network 355 block. In one or more example implementations, a subset of the components illustrated as included in the memory 610 can be used. For example, the memory 710 can include the compressor 335 block, the envelope detector 340 block, the threshold aligner 345 block, the feature normalizer 350 block, and the neural network 355 block without the other components.

Figure 7:
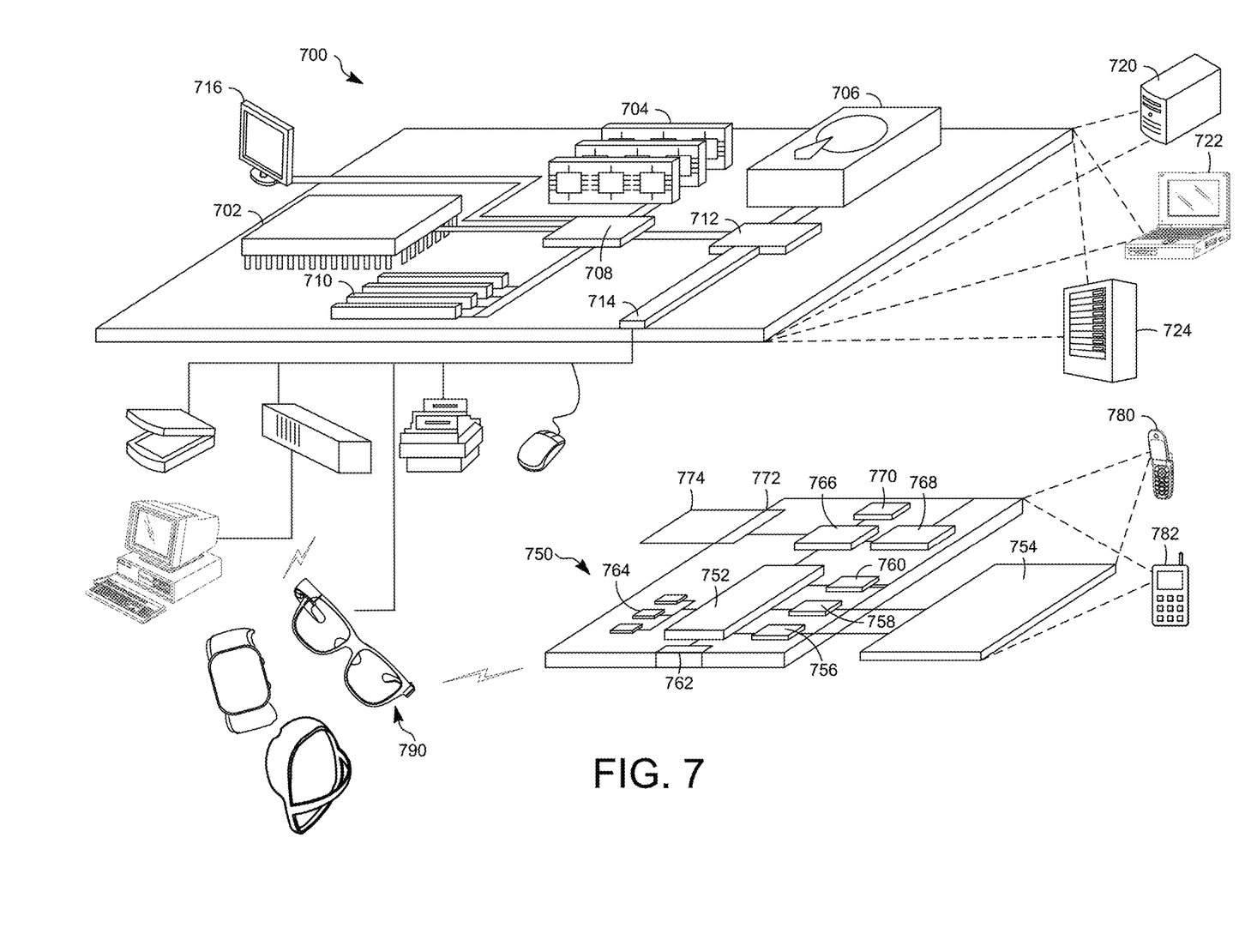
FIG. 7 shows an example of a computer device and a mobile computer device according to at least one example implementation.

FIG. 7 illustrates an example of a computer device 700 and a mobile computer device 750, which may be used with the techniques described here (e.g., to implement the smart glasses computing device). The computing device 700 includes a processor 702, memory 704, a storage device 706, a high-speed interface 708 connecting to memory 704 and high-speed expansion ports 710, and a low-speed interface 712 connecting to low-speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, or memory on processor 702.

The high-speed controller 708 manages bandwidth-intensive operations for the computing device 700, while the low-speed controller 712 manages lower bandwidth-intensive operations. Such allocation of functions is example only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD (Thin-Film-Transistor Liquid Crystal Display), and LED (Light Emitting Diode) or an OLED (Organic Light Emitting Diode) display, or other appropriate display technology. The display interface 756 may include appropriate circuitry for driving the display 754 to present graphical and other information to a user. The control interface 758 may receive commands from a user and convert them for submission to the processor 752. In addition, an external interface 762 may be provided in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In-Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provided as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752, that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, Wi-Fi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in the figure can include sensors that interface with an AR headset/HMD device 790 to generate an augmented environment for viewing inserted content within the physical space. For example, one or more sensors included on a computing device 750 or other computing device depicted in the figure, can provide input to the AR headset 790 or in general, provide input to an AR space. The sensors can include, but are not limited to, a touchscreen, accelerometers, gyroscopes, pressure sensors, biometric sensors, temperature sensors, humidity sensors, and ambient light sensors.

The computing device 750 can use the sensors to determine an absolute position and/or a detected rotation of the computing device in the AR space that can then be used as input to the AR space. For example, the computing device 750 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer. In some implementations, the user can aim at a target location using a virtual laser pointer.

In some implementations, one or more input devices included on, or connect to, the computing device 750 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 750 when the computing device is incorporated into the AR space can cause a particular action to occur in the AR space.

In some implementations, a touchscreen of the computing device 750 can be rendered as a touchpad in AR space. A user can interact with the touchscreen of the computing device 750. The interactions are rendered, in AR headset 790 for example, as movements on the rendered touchpad in the AR space. The rendered movements can control virtual objects in the AR space.

In some implementations, one or more output devices included on the computing device 750 can provide output and/or feedback to a user of the AR headset 790 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 750 may appear as another object in a computer-generated, 3D environment. Interactions by the user with the computing device 750 (e.g., rotating, shaking, touching a touchscreen, swiping a finger across a touch screen) can be interpreted as interactions with the object in the AR space. In the example of the laser pointer in an AR space, the computing device 750 appears as a virtual laser pointer in the computer-generated, 3D environment. As the user manipulates the computing device 750, the user in the AR space sees movement of the laser pointer. The user receives feedback from interactions with the computing device 750 in the AR environment on the computing device 750 or on the AR headset 790. The user's interactions with the computing device may be translated to interactions with a user interface generated in the AR environment for a controllable device.

In some implementations, a computing device 750 may include a touchscreen. For example, a user can interact with the touchscreen to interact with a user interface for a controllable device. For example, the touchscreen may include user interface elements such as sliders that can control properties of the controllable device.

Computing device 700 is intended to represent various forms of digital computers and devices, including, but not limited to laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be examples only, and are not meant to limit implementations of the inventions described and/or claimed in this document.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

Further to the descriptions above, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
    in response to a control signal, generating an audio signal by a first audio device included in a first portion of a head mounted computing device;
    determining a first time associated with a peak of a first pulse associated with the audio signal;
    detecting the audio signal by a second audio device included in a second portion of the head mounted computing device;
    determining a second time associated with a peak of a second pulse associated with the detected audio signal;
    estimating a distance between the first portion and the second portion based on a difference between the first time and the second time;
    estimating an angle between one of the first portion or the second portion and a third portion of the head mounted computing device based on the difference between the first time and the second time;
    determining a frame configuration of the head mounted computing device based on the estimated distance and the estimated angle; and
    triggering an action using the head mounted computing device based on the frame configuration.

2. The method of claim 1, wherein
    the first portion of the head mounted computing device is located on an arm of a frame of the head mounted computing device proximate to a portion that goes over an ear, and
    the second portion of the head mounted computing device is located on the arm of the frame of the head mounted computing device proximate to a frame around a lens.

3. The method of claim 1, wherein the triggering of the action using the head mounted computing device based on the frame configuration includes selecting one of a plurality of actions the head mounted computing device is configured to perform.

4. The method of claim 1, wherein the frame configuration indicates a geometric position of portions of the frame of the head mounted computing device.

5. The method of claim 1, wherein the audio signal is not an electrical signal.

6. The method of claim 1, wherein the generating of the audio signal includes transmitting an ultrasonic pulse.

7. The method of claim 1, wherein the detecting of the audio signal includes filtering environmental interference.

8. The method of claim 1, wherein the detecting of the audio signal includes:
    detecting a rising edge of a received pulse, and
    generating a feature vector by cropping the received pulse based on the detected rising edge.

9. The method of claim 8, further comprising:
    generating a score using a neural network with the feature vector as an input, wherein the determining of the configuration of the head mounted computing device is based on the score.

10. A head mounted computing device comprising:
a first audio device;
a second audio device;
a frame including a first portion, a second portion, and a third portion, the second portion and the third portion are moveable in relation to the first portion, the second portion including the first audio device and the third portion including the second audio device; and
a processor configured to:
communicate a control signal configured to cause the first audio device to generate an audio signal;
determine a first time associated with a peak of a first pulse associated with the audio signal
receive the audio signal via the second audio device;
determine a second time associated with a peak of a second pulse associated with the received audio signal
estimate a distance between the second portion and the third portion based on a difference between the first time and the second time;
estimate an angle between one of the second portion or the third portion and the first portion based on the difference between the first time and the second time;
determine a configuration of the frame based on the estimated distance and the estimated angle;
trigger an action using the head mounted computing device based on the configuration of the frame.

11. The head mounted computing device of claim 10, wherein
the first portion of the frame is a portion of the frame around a lens,
the second portion of the frame is in a first arm of the frame proximate to where the first arm of the frame goes over an ear, and
the third portion of the frame is in a second arm of the frame proximate to the first portion of the frame.

12. The head mounted computing device of claim 10, wherein the triggering of the action using the head mounted computing device based on the frame configuration includes selecting one of a plurality of actions the head mounted computing device is configured to perform.

13. The head mounted computing device of claim 10, wherein the frame configuration indicates a geometric position of portions of the frame of the head mounted computing device.

14. The head mounted computing device of claim 10, wherein the audio signal is not an electrical signal.

15. The head mounted computing device of claim 10, wherein the generating of the audio signal includes transmitting an ultrasonic pulse.

16. The head mounted computing device of claim 10, wherein the receiving of the audio signal includes filtering environmental interference.

17. The head mounted computing device of claim 10, wherein the receiving of the audio signal includes:
detecting a rising edge of a received pulse, and
generating a feature vector by cropping the received pulse based on the detected rising edge.

18. The head mounted computing device of claim 17, further comprising:
generating a score using a neural network with the feature vector as an input, wherein the determining of the configuration of the head mounted computing device is based on the score.

19. A non-transitory computer-readable medium storing executable instructions that when executed by at least one processor cause the at least one processor to:
in response to a control signal, generate an audio signal by a first audio device included in a first portion of a head mounted computing device;
determine a first time associated with a peak of a first pulse associated with the audio signal;
detect the audio signal by a second audio device included in a second portion of the head mounted computing device;
determine a second time associated with a peak of a second pulse associated with the detected audio signal;
estimate a distance between the first portion and the second portion based on a difference between the first time and the second time;
estimate an angle between one of the first portion or the second portion and a third portion of the head mounted computing device based on a difference between the first time and the second time;
determine a frame configuration of the head mounted computing device based on the estimated distance and the estimated angle; and
trigger an action using the head mounted computing device based on the frame configuration.

20. The non-transitory computer-readable medium of claim 19, wherein the triggering of the action using the head mounted computing device based on the frame configuration includes selecting one of a plurality of actions the head mounted computing device is configured to perform.

* * * * *